(12) United States Patent
Nilsson

(10) Patent No.: US 10,570,575 B2
(45) Date of Patent: Feb. 25, 2020

(54) WATER JET UNIT AND METHOD FOR WORKING A SURFACE

(71) Applicant: Conjet AB, Haninge (SE)

(72) Inventor: Kjell Nilsson, Saltsjo-Boo (SE)

(73) Assignee: CONJET AB, Haninge (SE)

(*) Notice: Subject to any disclaimer, the term of this patent is extended or adjusted under 35 U.S.C. 154(b) by 39 days.

(21) Appl. No.: 16/067,620

(22) PCT Filed: Feb. 7, 2017

(86) PCT No.: PCT/SE2017/000009
§ 371 (c)(1),
(2) Date: Jul. 2, 2018

(87) PCT Pub. No.: WO2017/151030
PCT Pub. Date: Sep. 8, 2017

(65) Prior Publication Data
US 2019/0003135 A1    Jan. 3, 2019

(30) Foreign Application Priority Data

Feb. 29, 2016  (SE) ........................... 1600071

(51) Int. Cl.
*E01C 23/12* (2006.01)
*F16H 19/08* (2006.01)
*E04G 23/08* (2006.01)
*E01D 22/00* (2006.01)

(52) U.S. Cl.
CPC ........... *E01C 23/128* (2013.01); *F16H 19/08* (2013.01); *E01D 22/00* (2013.01); *E04G 23/081* (2013.01)

(58) Field of Classification Search
CPC .................... E01C 23/128; E04G 23/081
See application file for complete search history.

(56) References Cited

U.S. PATENT DOCUMENTS

| | | | | |
|---|---|---|---|---|
| 4,036,437 A | * | 7/1977 | Dreher | B05B 13/0405 239/752 |
| 4,081,200 A | * | 3/1978 | Cheung | E01C 23/128 239/172 |
| 4,309,850 A | * | 1/1982 | Benson | B24C 3/06 451/92 |

(Continued)

FOREIGN PATENT DOCUMENTS

| | | |
|---|---|---|
| SE | 524045 | 7/2002 |
| SE | 525915 | 5/2005 |

(Continued)

*Primary Examiner* — Janine M Kreck
*Assistant Examiner* — Michael A Goodwin
(74) *Attorney, Agent, or Firm* — Mark P. Stone

(57) ABSTRACT

A surface, e.g., a concrete surface, is worked by guiding a lance (23) which comprises a water jet mouthpiece (27) coupled to the high-pressure water over the surface in a working path and at the same oscillating the lance transversely to the working path. The oscillation is driven by an eccentric mechanism (30, 31) and has a stable eccentric position when the mechanism is rotated in the one direction and a stable eccentric position when it is rotated in the other direction. The two positions have a different eccentricity and impart different widths to the working. The working depth and the working width can be changed by changing the direction of rotation.

7 Claims, 3 Drawing Sheets

(56) References Cited

U.S. PATENT DOCUMENTS

| | | | |
|---|---|---|---|
| 5,361,993 A * | 11/1994 | Andersson | B05B 13/0405 |
| | | | 239/227 |
| 6,179,519 B1 | 1/2001 | Hilmersson | |
| 2003/0164174 A1 | 9/2003 | Akesson Stromdahl et al. | |
| 2009/0207207 A1 | 8/2009 | Hilmersson | |
| 2011/0204699 A1 | 8/2011 | Hilmersson | |
| 2018/0147589 A1 * | 5/2018 | Hilmersson | B05B 13/005 |

FOREIGN PATENT DOCUMENTS

| | | |
|---|---|---|
| WO | WO02/081823 | 10/2002 |
| WO | WO2009/154551 | 12/2009 |

\* cited by examiner

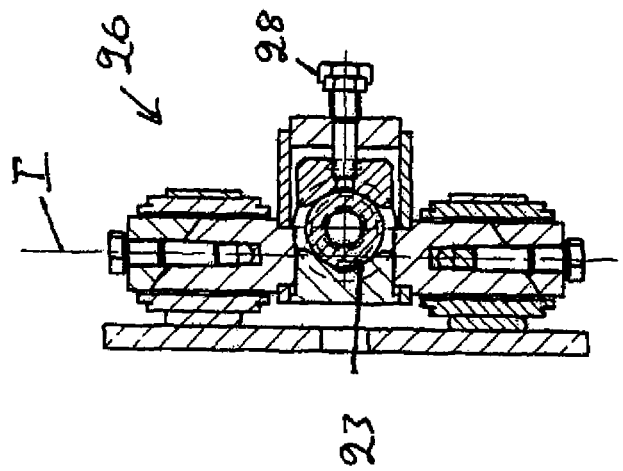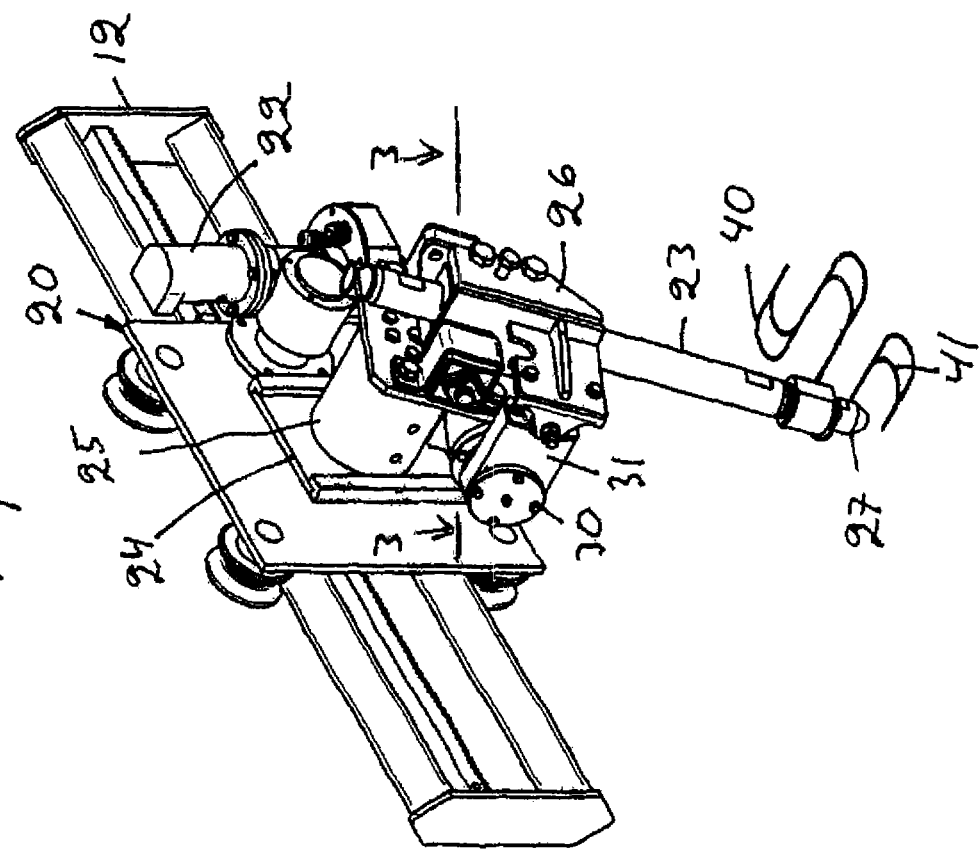

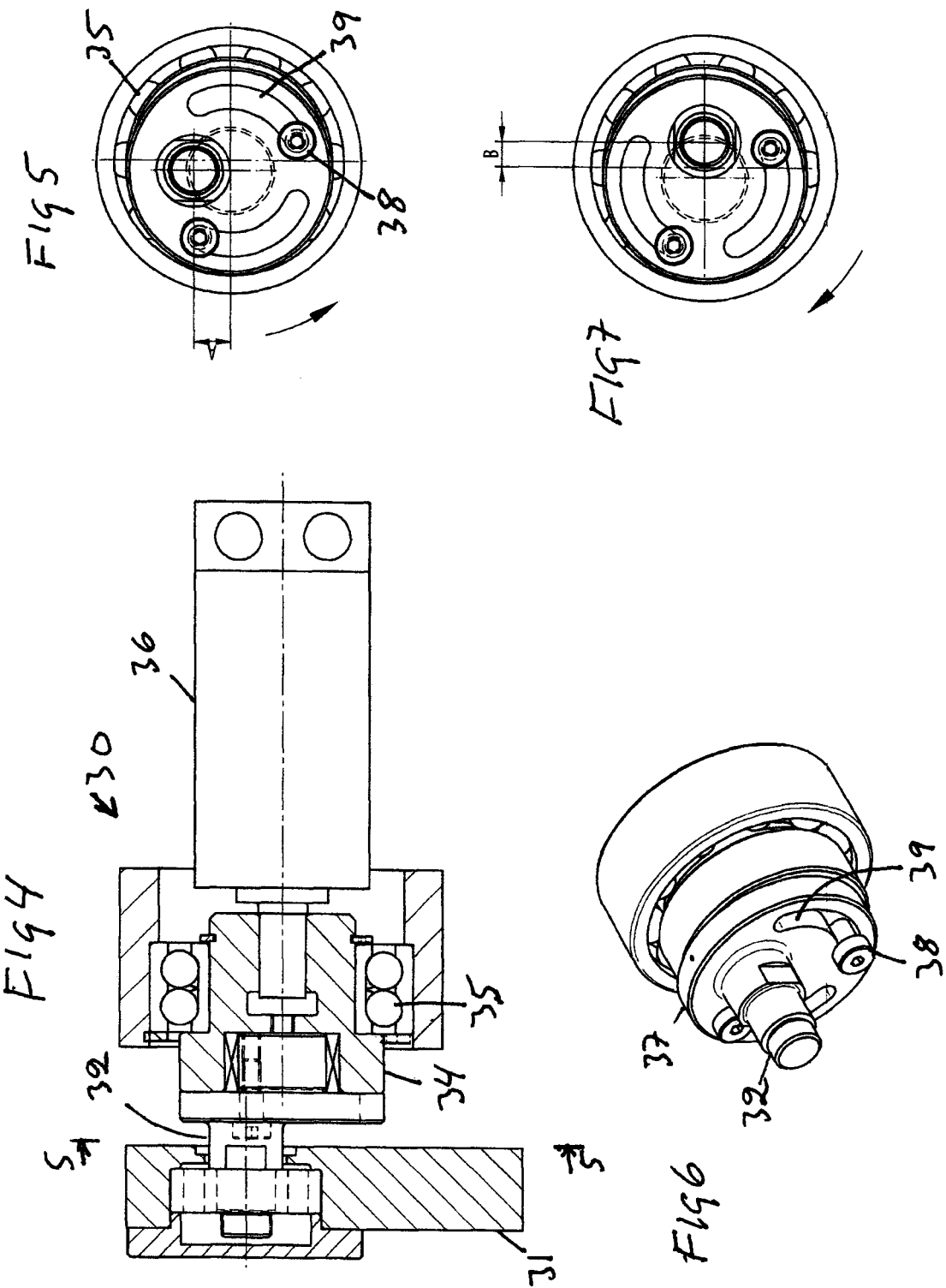

WATER JET UNIT AND METHOD FOR WORKING A SURFACE

BACKGROUND OF THE INVENTION

The invention relates to a water jet unit for surface working, e.g., for working a concrete surface, comprising:
a lance with a mouthpiece arranged for being coupled to a line for high-pressure water,
a holder for the lance,
an arrangement for guiding the holder in a working path,
an eccentric mechanism for the oscillation of the lance in a plane transverse to the working path in order to add width to the working. The invention also relates to a method of working a surface, e.g., a concrete surface by guiding a lance with a jet mouthpiece coupled to the high-pressure water in a path over the surface and at the same time oscillating the lance around an axis which is substantially parallel to the surface and substantially at a right angle to the path and located at a distance from the surface.

Machines and methods of this type are known from, for example, U.S. Pat. No. 6,877,930 B2 and WO 02/081823. A working sweep is made in one direction and the lance carrying the water mouthpiece is then turned to make an attack angle in the other direction and a return working sweep is made. During the working sweep the lance oscillates in a plane transverse to the directions of sweep in order to add a greater working width. Between every or after a few working sweeps the machine is advanced so that a cohesive working with a similar depth is obtained. Such machines are used, for example, for the working of the surface layer of concrete on a bridge deck before casting of a new surface layer. In this manner the uppermost reinforcement layer is exposed so that it can then be cast in fresh concrete during the new casting of the surface layer.

PRIMARY OBJECT OF THE INVENTION

A goal of the invention is to be able to adjust the working width and the working depth in a simple and rapid manner and in particular to be able to do this without having to interrupt the working operation.

BRIEF SUMMARY OF THE INVENTION

The eccentric mechanism of the unit has a stable eccentric position when it is rotated in the one direction and a stable eccentric position when it is rotated in the other direction, wherein the two positions have a different eccentricity and therefore a different width of the working is made. As a result, the oscillation angle of the lance can be changed by changing the direction of rotation of the eccentric mechanism, which affects the working width as well as the working depth. The invention is defined by the patent claims.

BRIEF DESCRIPTION OF THE SEVERAL VIEWS OF THE DRAWINGS

FIG. 2 shows a feed beam and a working unit according to the invention in perspective.
FIG. 3 is a fragmentary section taken along line 3-3 in FIG. 2.
FIG. 4 shows an oscillation unit in section from FIG. 2.
FIG. 5 is a section taken along line 5-5 in FIG. 4.
FIG. 6 is a perspective view taken as shown by line 5-5 in FIG. 4.
FIG. 7 corresponds to FIG. 5 but shows details in another relative position.

DETAILED DESCRIPTION OF THE INVENTION

Figure 1:
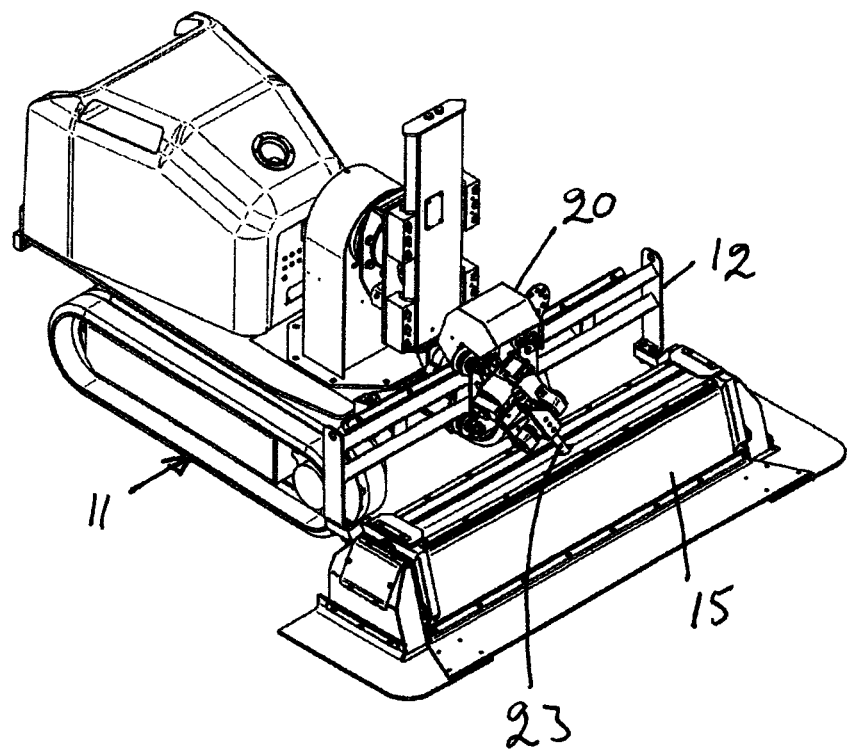
FIG. 1 shows a mobile water jet unit in accordance with the invention.

FIG. 1 shows a mobile carrier 11 which carries a feed beam 12 on which a crab 20 is mounted. The crab comprises a water jet lance 23 with a jet mouthpiece which sticks down in a slot in a protective rubber hood 15. The jet lance is to be coupled to a line (not shown) for high-pressure water. The crab comprises a motor which drives it along the feed beam in a working sweep. The jet lance oscillates transversely to the direction of the sweep of the crab as will be described below.

FIGS. 2-3 show the crab 20 and the feed beam 12. The crab 20 comprises a motor 22 which drives it along the feed beam 12 by a drive arrangement. The crab comprises a working unit 24, which carries the lance 23. A motor 25 can impart an inclination to the lance 23 in the one or the other direction in a plane parallel with the feed beam so that the lance assumes an attack angle. The lance 23 comprises a jet mouthpiece 27 which is held close to the surface to be worked. The working unit 24 comprises a fastener/holder 26 for the lance 23 and this fastener is supported so that it can pivot about an axis I. The fastener 26 and with it the lance 23 are coupled to an oscillation unit 30 by a link 31 so that the lance 23 can oscillate transversely to the working path around axis I. which is at a distance from the jet mouthpiece 27. The oscillation unit 30 and the link 31 form an oscillation mechanism. The lance is fixed at the desired height by a screw 28.

FIGS. 4-7 show the oscillation unit 30 mounted on the working unit 24. It comprises a unit 34 which is rotatably supported in bearing 35 and is coupled to a rotary motor 36. The unit 34 constitutes a crank arm carrier which comprises a crank arm 32 in the form of an eccentrically placed pin. When the motor 36 is rotating, the crank arm 32 causes link 31 to oscillate and with it the fastening 26 of the lance and the lance 23 in a plane transverse to the movement of the crab 20. The oscillation adds width to the working path which the water beam of the lance cuts in the underlayer, for example in a surface of concrete which can be a bridge deck. The rotating unit 34 comprises an outer part 37 which carries the crank arm 32 and this outer part 37 comprises short spiral tracks 39 and is mounted with stop elements shown as bolts 38 which run in these tracks. When the motor 36 rotates in the one direction which is shown with an arrow in FIG. 5, the bolts 38 engage with the one end of the spiral tracks and the crank arm will have a stable eccentricity A which is apparent from FIG. 5. When the motor is rotated instead in the other direction the bolts 38 engage with the other ends of the spiral tracks 39 and impart the stable eccentricity B. The oscillation angle of lance 23 therefore becomes different depending on the direction in which the motor rotates. FIG. 2 shows the path 40 of the jet of water during a working sweep to the left in the figure when the motor rotates according to FIG. 5 and the path 41 of the jet of water when the motor rotates in the other direction according to FIG. 7. In this manner the width of the working path can be changed in a simple manner by changing the direction of rotation of the motor 36, which can be done during the ongoing working.

FIG. 2 shows a working sweep to the left in the figure and the lance is adjusted to set an attack angle. If the water jet unit is also used to make a working sweep in the other direction, the lance is pivoted during the turning in order to also present an attack angle in that direction.

Given a constant speed of the crab, the width of the working path becomes smaller and the working depth becomes greater at the lesser oscillation angle obtained according to FIG. 7 than at the oscillation angle obtained according to FIG. 5. Both the oscillation angles and the sweeping speed can be varied during the working.

The example shows two stable eccentric positions and a person skilled in the art will understand that the eccentric mechanism 31-39 can be modified so that he can obtain two stable positions in another manner than the one shown by changing the direction of rotation of the motor.

The example shows a feed beam with crab which carries a working unit. A person skilled in the art will understand that the working unit can be carried in another manner. It can be mounted, for example, at the end on a boom which can swing the working unit along an arc-shaped working sweep. This can be suitable for vertical surfaces. A frame with an indexable feed beam which carries the working unit can for example also be mounted on the vertical surface.

The invention claimed is:

1. Water jet unit for working surfaces, including a concrete surface, comprising:
   a lance (23) with a mouthpiece (27) arranged for being coupled to a source of pressurized water,
   a holder (24, 26) for the lance,
   an arrangement (12, 20) for guiding the holder in a working path,
   an eccentric mechanism (30, 31) for oscillation of the lance in a plane transverse to the working path in order to add width to the working path,
   wherein the eccentric mechanism (30, 31) comprises two parts limitedly rotatable relative to each other, one of said parts having a stop element (38) in engagement with a spiral track (39) of the other part so as to define two stable end positions of the relative rotation, thereby defining one stable eccentricity when the eccentric mechanism is rotated in a first direction and another different stable eccentricity when the eccentric mechanism is rotated in a second direction that is opposite the first direction.

2. Water jet unit according to claim 1, wherein the eccentric mechanism (30, 31) comprises a crank arm (32) coupled to a link (31) which is coupled to the lance (23) to oscillate said lance, wherein the crank arm is arranged on a crank arm carrier (34, 37) which is rotatable supported and is coupled to a rotary motor (36) and the crank am carrier comprises an outer part (37), which carries the crank arm and is mounted on another part (34) and can rotate on said another part between the two stable end positions.

3. Water jet unit according to claim 2, comprising a mobile carrier (11) for a feed beam (12) along which a crab (20), which carries the holder (24, 26), is mounted.

4. Water jet unit according to claim 1, wherein said water jet unit comprises a mobile carrier (11) for a feed beam (12) along which a crab (20), which carries the holder (24, 26), is mounted.

5. Water jet unit for working surfaces, including a concrete surface, comprising:
   a lance (23) with a mouthpiece (27) arranged for being coupled to a source of pressurized water,
   a holder (24, 26) for the lance,
   an arrangement (12,20) for guiding the holder in a working path,
   an eccentric mechanism (30, 31) for the oscillation of the lance in a plane transverse to the working path in order to add width to the working path,
   wherein the eccentric mechanism (30, 31) of the unit has a first stable eccentric position when it is rotated in a first direction and a second stable eccentric position when it is rotated in a second direction that is opposite the first direction, wherein the two positions have a different eccentricity and therefore produce a different width of the working path,
   wherein the eccentric mechanism (30, 31) comprises a crank arm (32) coupled to a link (31) which is coupled to the lance (23) to oscillate the lance, wherein the crank arm is arranged on a crank arm carrier (34, 37) which is rotatably supported and is coupled to a rotary motor (36), and the crank arm carrier comprises a first outer part (37), which carries the crank arm and is mounted on a second part (34) and can rotate on said second part between the two stable positions,
   wherein one of the first and second parts of the crank carrier has at least one spiral track (39) and the other of the first and second parts of the crank carrier has at least one stop element (38) engaging into the spiral track to define the first and second stable eccentric positions.

6. Water jet unit according to claim 5, comprising a mobile carrier (11) for a feed beam (12) along which a crab (20), which carries the holder (24, 26), is mounted.

7. Method for working a surface, including a concrete surface, by guiding a lance (23), which comprises a water jet mouthpiece (27) coupled to a source of pressurized water, over the surface in a working path and at the same time oscillating the lance transversely to the working path, wherein, during operation, an oscillation angle of the lance (23) is adjustable to adjust width and/or depth of the working path, wherein an oscillation mechanism (30, 31) is used, which is driven by a rotary motor (36), and has two oscillation angles for the lance, and change between the oscillation angles is carried out by changing the direction of rotation on the motor.

* * * * *

UNITED STATES PATENT AND TRADEMARK OFFICE
CERTIFICATE OF CORRECTION

PATENT NO. : 10,570,575 B2  
APPLICATION NO. : 16/067620  
DATED : February 25, 2020  
INVENTOR(S) : Kjell Nilsson Page 1 of 1

It is certified that error appears in the above-identified patent and that said Letters Patent is hereby corrected as shown below:

In the Claims

Column 3, Line 49 (Claim 2, Line 5): Delete "rotatable" and substitute --rotatably--.

Signed and Sealed this
Twenty-eighth Day of April, 2020

Andrei Iancu
*Director of the United States Patent and Trademark Office*